United States Patent
Vitvitskyy et al.

(10) Patent No.: US 10,455,253 B1
(45) Date of Patent: Oct. 22, 2019

(54) SINGLE DIRECTION LONG INTERPOLATION FILTER

(71) Applicant: GOOGLE LLC, Mountain View, CA (US)

(72) Inventors: Stanislav Vitvitskyy, Mountain View, CA (US); Jingning Han, Santa Clara, CA (US); Ching-Han Chiang, San Jose, CA (US); Adrian W. Grange, Los Gatos, CA (US)

(73) Assignee: GOOGLE LLC, Mountain View, CA (US)

( * ) Notice: Subject to any disclaimer, the term of this patent is extended or adjusted under 35 U.S.C. 154(b) by 253 days.

(21) Appl. No.: 15/445,063

(22) Filed: Feb. 28, 2017

(51) Int. Cl.
| | |
|---|---|
| *H04N 7/00* | (2011.01) |
| *H04N 19/52* | (2014.01) |
| *H04N 19/117* | (2014.01) |
| *H04N 19/80* | (2014.01) |
| *H04N 19/51* | (2014.01) |

(52) U.S. Cl.
CPC ............ *H04N 19/80* (2014.11); *H04N 19/51* (2014.11)

(58) Field of Classification Search
CPC ............................... H04N 19/80; H04N 19/51
USPC ......................................................... 375/240
See application file for complete search history.

(56) References Cited

U.S. PATENT DOCUMENTS

| | | | |
|---|---|---|---|
| 8,705,622 B2 | 4/2014 | Ye et al. | |
| 2009/0257503 A1 | 10/2009 | Ye et al. | |
| 2010/0074332 A1* | 3/2010 | Karczewicz | H04N 19/52 375/240.12 |
| 2012/0155533 A1* | 6/2012 | Puri | H04N 19/176 375/240.02 |
| 2012/0170650 A1* | 7/2012 | Chong | H04N 19/593 375/240.12 |
| 2013/0216150 A1* | 8/2013 | Kondo | G06T 9/004 382/238 |
| 2013/0301742 A1* | 11/2013 | Cheung | H04N 19/433 375/240.29 |
| 2014/0112391 A1* | 4/2014 | Matsuo | H04N 19/139 375/240.16 |
| 2016/0005155 A1* | 1/2016 | Sato | H04N 19/132 382/263 |

OTHER PUBLICATIONS

Lakshman, Haricharan et al: "Generalized Interpolation for Motion Compensation Prediction"; 2011 18th IEEE International Conference on Image Processing; pp. 1213-1216.

(Continued)

*Primary Examiner* — Susan E. Hodges
(74) *Attorney, Agent, or Firm* — Young Basile Hanlon & MacFarlane, P.C.

(57) ABSTRACT

A first interpolation filter is selected for a first direction of the prediction block, and a second interpolation filter is selected for a second direction of the prediction block. The first interpolation filter has a first number of taps and the second interpolation filter has a second number of taps. The second interpolation filter is set to an interpolation filter having a third number of taps in response to determining that the first number of taps is greater than a threshold number of taps and the second number of taps is greater than a threshold number of taps. The third number of taps is smaller than or equal to the threshold number of taps. The prediction block is generated using the first interpolation filter and the second interpolation filter.

14 Claims, 11 Drawing Sheets

(56) References Cited

OTHER PUBLICATIONS

Hao LV, et al., "A Comparison of fractional-pel interpolation filters in HEVC and H.264/AVC," Visual Communications and Image Processing (VCIP), 2012 IEEE, 6 pages.
Bankoski, et al., "Technical Overview of VP8, An Open Source Video Codec for the Web", Jul. 11, 2011, 6 pp.
Series H: Audiovisual and Multimedia Systems, Coding of moving video: Implementors Guide for H.264: Advanced video coding for generic audiovisual services, International Telecommunication Union, Jul. 30, 2010, 15 pp.
Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.

* cited by examiner

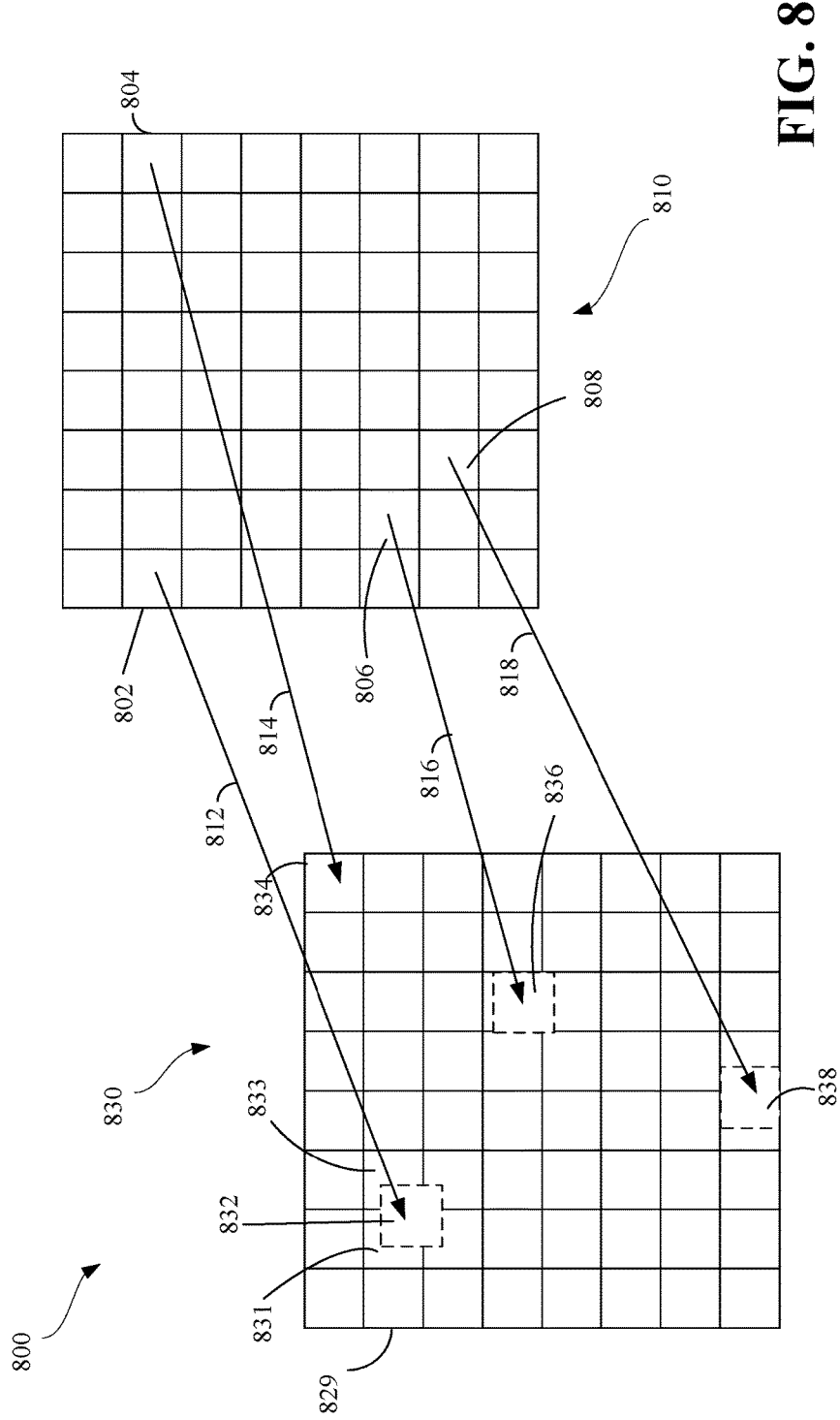

SINGLE DIRECTION LONG INTERPOLATION FILTER

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission or storage of the video data. Various approaches have been proposed to reduce the amount of data in video streams, including compression and other encoding techniques.

Encoding based on motion estimation and compensation may be performed by breaking frames or images into blocks which are predicted based on one or more prediction blocks of reference frames. Differences (i.e., residual errors) between blocks and prediction blocks are compressed and encoded in a bitstream. A decoder uses the differences and the reference frames to reconstruct the frames or images.

SUMMARY

Disclosed herein are aspects, features, elements, and implementations of single direction long interpolation filter.

One aspect of the disclosed implementations is a method for determining a prediction block. The method includes selecting a first interpolation filter for a first direction of the prediction block and selecting a second interpolation filter for a second direction of the prediction block. The first interpolation filter has a first number of taps, and the second interpolation filter has a second number of taps. The method also includes setting the second interpolation filter to an interpolation filter having a third number of taps in response to determining that the first number of taps is greater than a threshold number of taps and the second number of taps is greater than the threshold number of taps, and generating the prediction block using the first interpolation filter and the second interpolation filter. The third number of taps is smaller than or equal to the threshold number of taps.

An apparatus for determining a prediction block according to one implementation of this disclosure includes a processor. The processor is configured to execute operations to select a first interpolation filter for a first direction of the prediction block and select a second interpolation filter for a second direction of the prediction block. The first interpolation filter has a first number of taps, and the second interpolation filter has a second number of taps. The processor is also configured to set the second interpolation filter to an interpolation filter having a third number of taps in response to determining that the first number of taps is greater than a threshold number of taps and the second interpolation filter is greater than the threshold number of taps and to generate the prediction block using the first interpolation filter and the second interpolation filter. The third number of taps is smaller than or equal to the threshold number of taps.

An apparatus for generating a prediction block by a decoder according to another implementation of this disclosure also includes a processor. The processor is configured to execute operations to receive a first interpolation filter having a first number of taps for a first direction of the prediction block and a second interpolation filter having a second number of taps for a second direction of the prediction block and to generate intermediate pixel values for the prediction block using the one of the first interpolation filter and the second interpolation filter having a smaller number of taps.

In some implementations, the operations within the encoder and/or the decoder are stored as computer code in a non-transitory memory and are executed by the processor.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings wherein like reference numerals refer to like parts throughout the several views.

FIG. 7 is a diagram of an interpolation operation according to implementations of this disclosure.

FIG. 8 is a diagram of motion vectors representing full and sub-pixel motion according to implementations of this disclosure.

FIGS. 9A and 9B are diagrams of generating a prediction block according to implementations of this disclosure.

DETAILED DESCRIPTION

Figure 1:
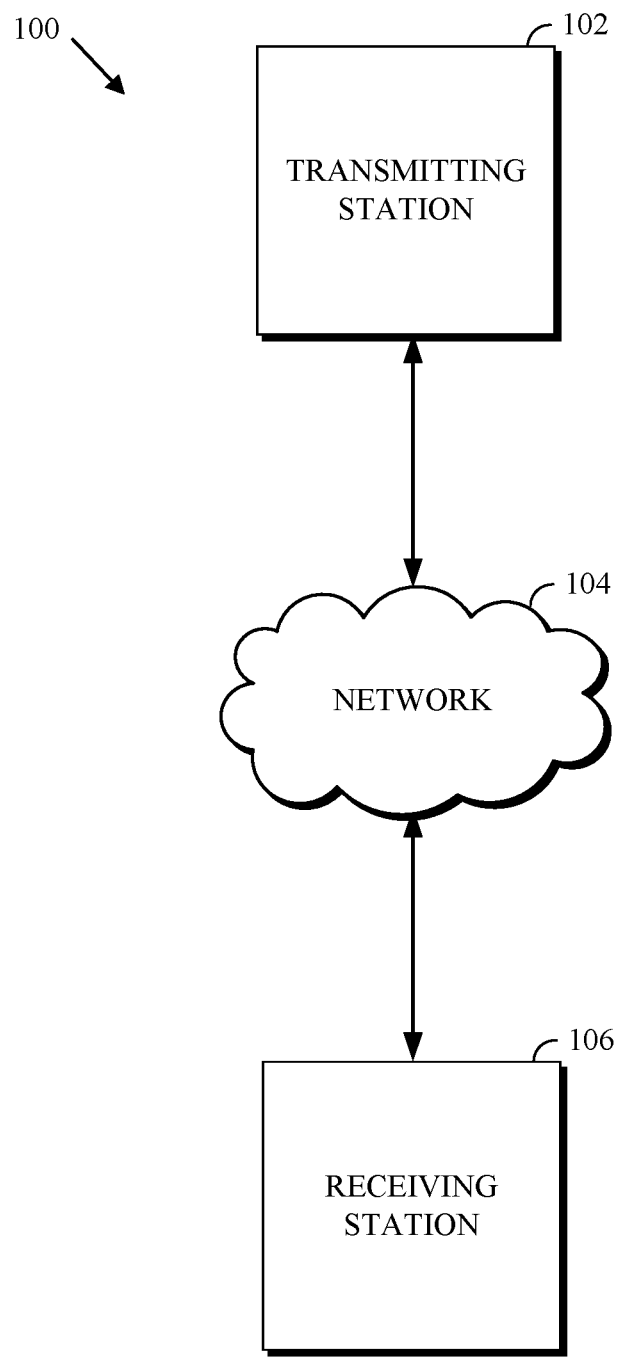
FIG. 1 is a schematic of a video encoding and decoding system.

As mentioned above, compression schemes related to coding video streams may include breaking images into blocks and generating a digital video output bitstream using one or more techniques to limit the information included in the output. A received bitstream can be decoded to re-create the blocks and the source images from the limited information. Encoding a video stream, or a portion thereof, such as a frame or a block, can include using temporal or spatial similarities in the video stream to improve coding efficiency. For example, a current block of a video stream may be encoded based on identifying a difference (residual) between the previously-coded pixel values and those in the current block. In this way, only the residual and parameters used to generate it need be added to the bitstream instead of including the entirety of the current block. This technique may be referred to as inter-prediction. The residual may be encoded using a lossy quantization step. Decoding (i.e., reconstructing) an encoded block from such a residual often results in a distortion between the original and the reconstructed block.

One of the parameters in inter-prediction is a motion vector that represents the spatial displacement of the previously coded block relative to the current block. The motion vector can be identified using a method of motion estimation, such as a motion search. In the motion search, a portion of a reference frame (e.g., a reference block) can be translated to a succession of locations to form respective prediction blocks that can be subtracted from a portion of a current frame to form a series of residuals. The reference block can be translated in one direction or in first direction and a second direction. The first direction and the second direction can be, respectively, the horizontal direction and the vertical direction of the reference block, or vice versa. The horizontal and/or vertical translations corresponding to the location having, e.g., the smallest, residual can be selected as the motion vector. Bits representing the motion vector can be included in the encoded bitstream to permit a decoder to reproduce the prediction block and decode the portion of the encoded video bitstream associated with the motion vector.

In some situations, the prediction block that results in the best residual may not correspond with pixels in the reference frame. That is, the best motion vector may point to a location that is between pixels of blocks in the reference frame. In this case, motion compensated prediction at the sub-pixel level is useful. Motion compensated prediction may involve the use of a sub-pixel interpolation filter (also referred to as "interpolation filter" or "interpolation filter type") that generates filtered sub-pixel values at defined locations between the full pixels (also called integer pixels) of the reference frame or the reference block along rows, columns, or both. The interpolation filter may be one of a number of interpolation filters available for use in motion compensated prediction, where each of the interpolation filters has a different frequency profile or response.

Some video formats use different interpolation filter types. For example, three interpolation filter types named according to their different frequency profiles may be used: a smooth filter, a normal filter, and a sharp filter. The interpolation filter to be used by a decoder to generate a prediction block may be signaled in the encoded bitstream.

An interpolation filter includes a filter size (i.e., number of taps) that can correspond to the number (i.e., cardinality) of pixels and/or coefficients (i.e., weights) used by an interpolation operation using the interpolation filter. For example, the interpolation filters may be 8-tap filters. That is, the interpolation filters are of size 8 or have 8 filter coefficients. To generate a prediction block for a block of video having a first direction and a second direction, the same interpolation filter (i.e., the same filter type and number of taps/coefficients) may be used to interpolate pixels in the first and the second directions in order to generate sub-pixel motion-compensated prediction (i.e., to generate the pixel values of the prediction block).

To produce a sub-pixel prediction, a first interpolation filter is applied in a first direction to pixel values of the reference frame (or reference block) to produce an intermediate reference block of intermediate pixel values. A second interpolation filter is applied to the intermediate pixel values in a second direction to generate the pixel values of the prediction block. As indicated above, the first direction and the second direction can be, respectively, the horizontal direction and the vertical direction. Alternatively, the first direction and the second direction can be, respectively, the vertical direction and the horizontal direction.

An encoder may generate prediction blocks based on each of the available interpolation filters. The encoder then selects, and can signal to a decoder in an encoded bitstream, the interpolation filter that results in, e.g., the best rate-distortion ratio. A rate-distortion ratio refers to a ratio that balances an amount of distortion (i.e., loss in video quality) with rate of bits (i.e., the number of bits required for encoding the residual).

Increasing the filter size (i.e., using more filter coefficients) can provide a finer resolution in the frequency domain, which can be critical for signals that contain high frequency components. For example, a 12-tap filter can result in a better frequency response (e.g., a higher precision in the frequency domain) than an 8-tap filter. However, interpolation filters with larger sizes result in increased complexity as compared to interpolation filters with smaller sizes. As further described below, the complexity is increased, especially for a hardware-implemented decoder, due to an increase in the number of multiplication operations and/or deeper adder trees required to perform an interpolation operation using larger interpolation filters.

In implementations of this disclosure, motion prediction may be improved by balancing the gains in compression performance and increased complexity associated with using relatively large interpolation filters, such as using a 12-tap interpolation filters, by using a long interpolation filter in only a single direction. Details are described herein after first describing an environment in which the single direction long interpolation filter disclosed herein may be implemented.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network or any other means of transferring the video stream from the transmitting station 102 to, in this example, the receiving station 106.

Figure 2:
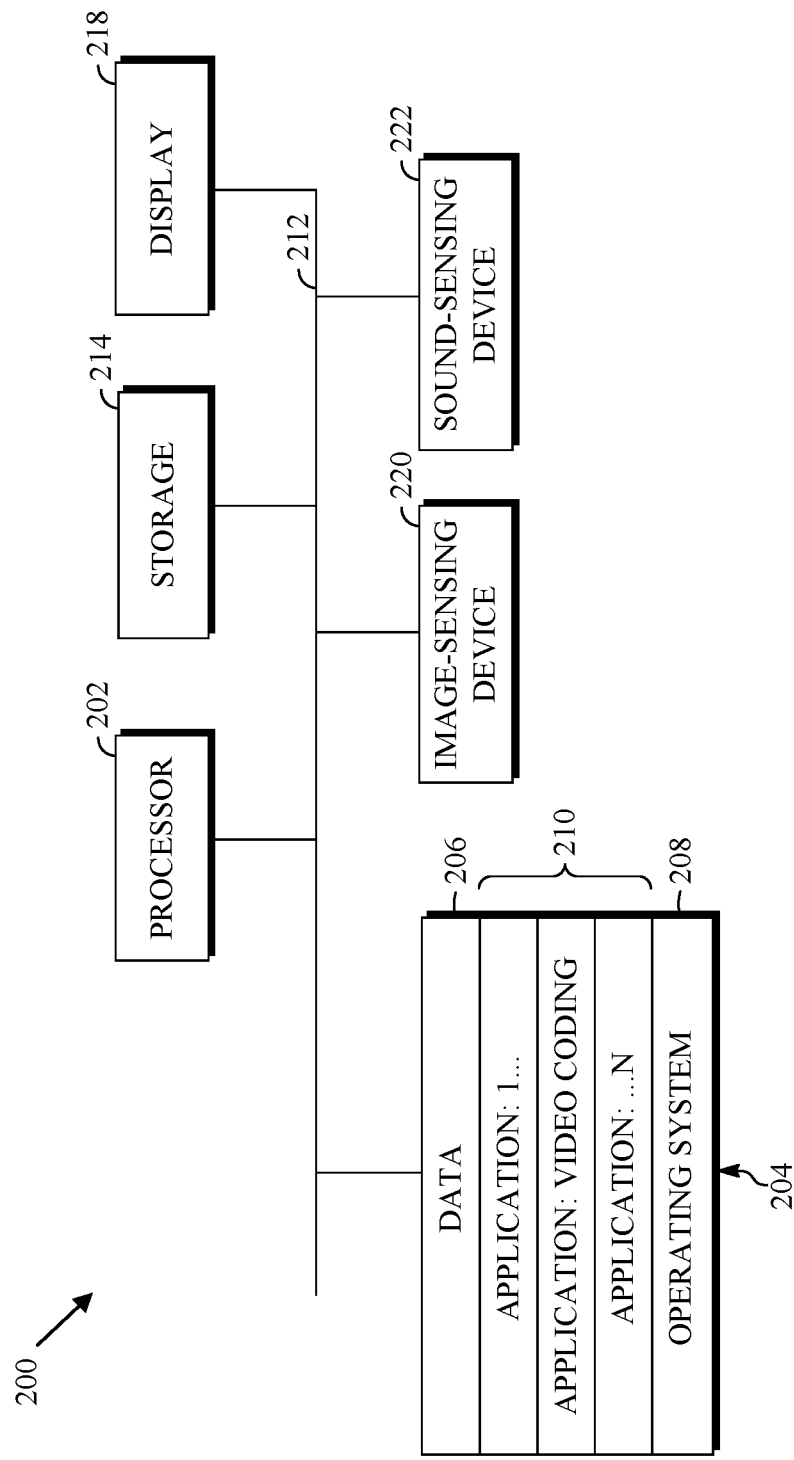
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., an HTTP-based video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of a single computing device, for example, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, capable of manipulating or processing information now-existing or hereafter developed. Although the disclosed implementations can be practiced with a single processor as shown, e.g., the CPU 202, advantages in speed and efficiency can be achieved using more than one processor.

A memory 204 in the computing device 200 can be a read-only memory (ROM) device or a random access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. The computing device 200 can also include a secondary storage 214, which can, for example, be a memory card used with a computing device 200 that is mobile. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (each machine having one or more processors) that can be coupled directly or across a local area or other network. The memory 204 can be distributed across multiple machines such as a network-based memory or memory in multiple machines performing the operations of the computing device 200. Although depicted here as a single bus, the bus 212 of the computing device 200 can be composed of multiple buses. Further, the secondary storage 214 can be directly coupled to the other components of the computing device 200 or can be accessed via a network and can comprise a single integrated unit such as a memory card or multiple units such as multiple memory cards. The computing device 200 can thus be implemented in a wide variety of configurations.

Figure 3:
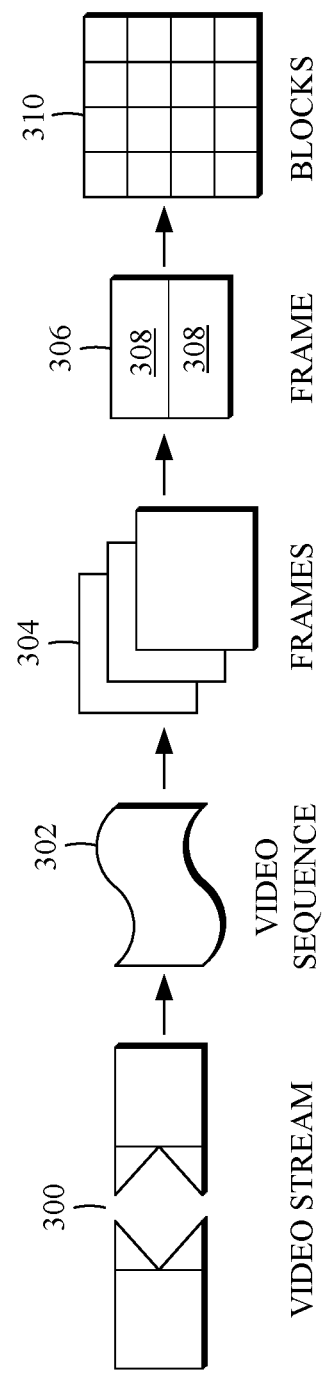
FIG. 3 is a diagram of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of segments 308 or planes. The segments 308 can be subsets of frames that permit parallel processing, for example. The segments 308 can also be subsets of frames that can separate the video data into separate colors. For example, the frame 306 of color video data can include a luminance plane and two chrominance planes. The segments 308 may be sampled at different resolutions.

Whether or not the frame 306 is divided into the segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels or larger.

Figure 4:
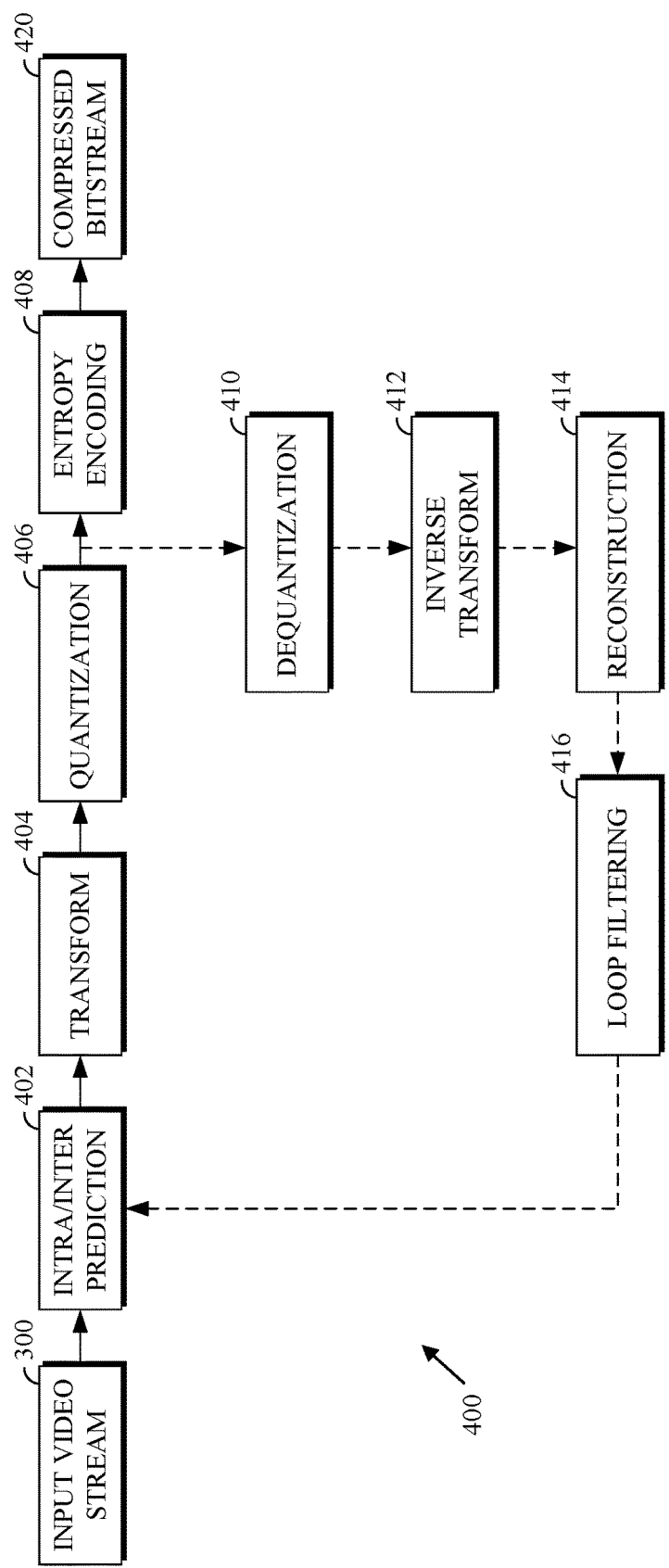
FIG. 4 is a block diagram of an encoder according to implementations of this disclosure.

FIG. 4 is a block diagram of an encoder 400 according to implementations of this disclosure. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in the manner described herein. The encoder 400 can also be implemented as specialized hardware included in, for example, the transmitting station 102. The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, the frame 306 can be processed in units of blocks. At the intra/inter prediction stage 402, a block can be encoded using intra-frame prediction (also called intra-prediction) or inter-frame prediction (also called inter-prediction), or a combination of both. In any case, a prediction block can be formed. In the case of intra-prediction, all or a part of a prediction block may be formed from samples in the current frame that have been previously encoded and reconstructed. In the case of inter-prediction, all or part of a prediction block may be formed from samples in one or more previously constructed reference frames determined using motion vectors.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. Such block-based transforms include, for example, the Discrete Cosine Transform (DCT) and the Asymmetric Discrete Sine Transform (ADST). Other block-based transforms are possible. Further, combinations of different transforms may be applied to a single residual. In one example of application of a transform, the DCT transforms the residual block into the frequency domain where the transform coefficient values are based on spatial frequency. The lowest frequency (DC) coefficient at the top-left of the matrix and the highest frequency coefficient at the bottom-right of the matrix. It is worth noting that the size of a prediction block, and hence the resulting residual block, may be different from the size of the transform block. For example, the prediction block may be split into smaller blocks to which separate transforms are applied.

The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. Entropy coding may be performed using any number of techniques, including token and binary trees. The entropy-encoded coefficients, together with other information used to decode the block, which may include for example the type of prediction used, transform type, motion vectors and quantizer value, are then output to the compressed bitstream 420. The information to decode the block may be entropy coded into block, frame, slice and/or section headers within the compressed bitstream 420. The compressed bitstream 420 can also be referred to as an encoded video stream or encoded video bitstream, and the terms will be used interchangeably herein.

The reconstruction path in FIG. 4 (shown by the dotted connection lines) can be used to ensure that both the encoder 400 and a decoder 500 (described below) use the same reference frames and blocks to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder 400 can quantize the residual signal directly without the transform stage 404 for certain blocks or frames. In another implementation, an encoder 400 can have the quantization stage 406 and the dequantization stage 410 combined into a single stage.

Figure 5:
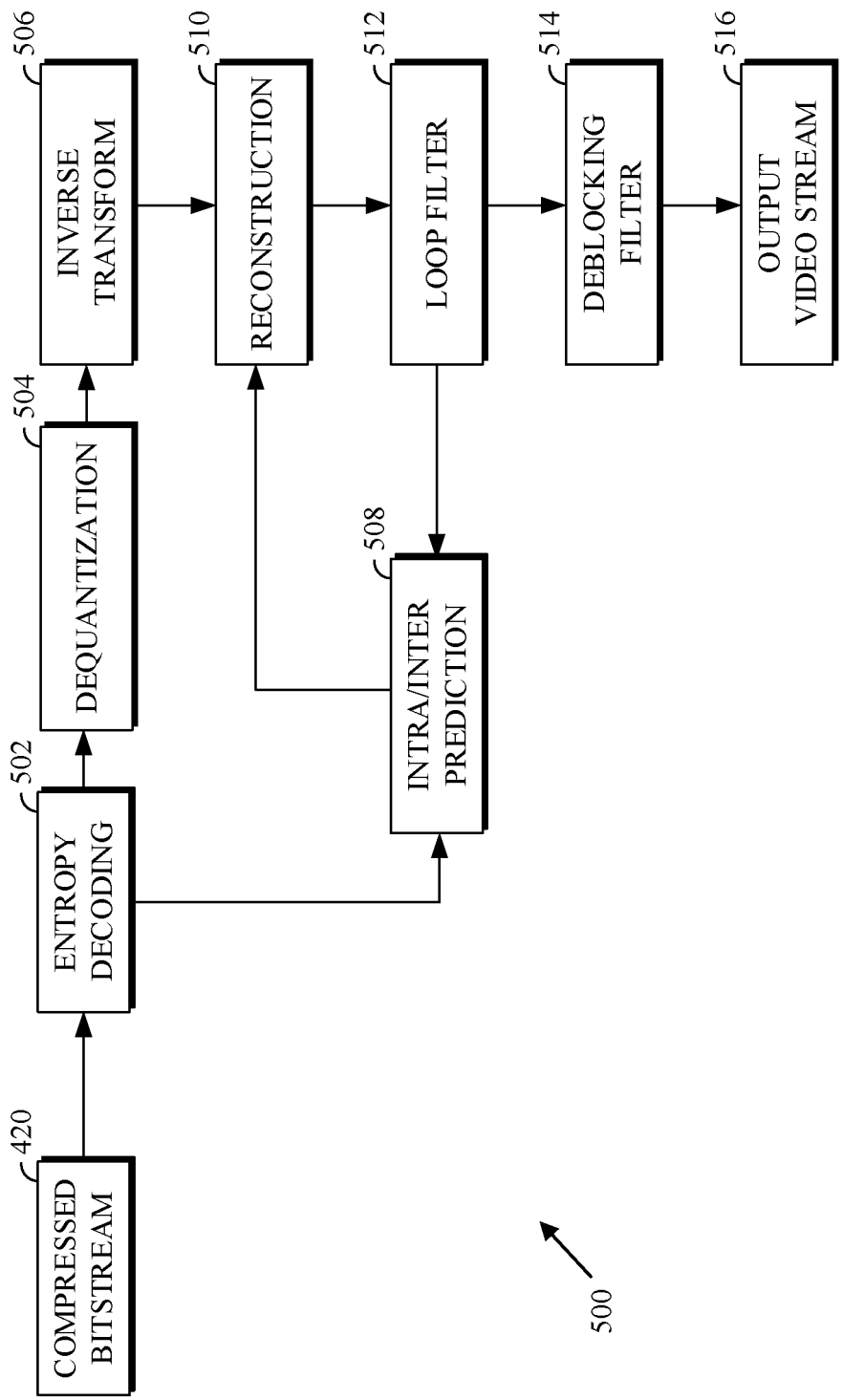
FIG. 5 is a block diagram of a decoder according to implementations of this disclosure.

FIG. 5 is a block diagram of a decoder 500 according to implementations of this disclosure. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described in FIGS. 6 and 10 below. The decoder 500 can also be implemented in hardware included in, for example, the transmitting station 102 or the receiving station 106. The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter-prediction stage 508, a reconstruction stage 510, a loop filtering stage 512 and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients using the selected transform type to produce a derivative residual that can be identical to that created by the inverse transform stage 412 in the encoder 400. Using header information decoded from the compressed bitstream 420, the decoder 500 can use the intra/inter-prediction stage 508 to create the same prediction block as was created in the encoder 400, e.g., at the intra/inter prediction stage 402. At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In this example, the deblocking filtering stage 514 is applied to the reconstructed block to reduce blocking distortion, and the result is output as an output video stream 516. The output video stream 516 can also be referred to as a decoded video stream, and the terms will be used interchangeably herein.

Other variations of the decoder 500 can be used to decode the compressed bitstream 420. For example, the decoder 500 can produce the output video stream 516 without the deblocking filtering stage 514. In some implementations of the decoder 500, the deblocking filtering stage 514 is applied before the loop filtering stage 512. Additionally, or alternatively, the encoder 400 includes a deblocking filtering stage in addition to the loop filtering stage 416.

Figure 6:
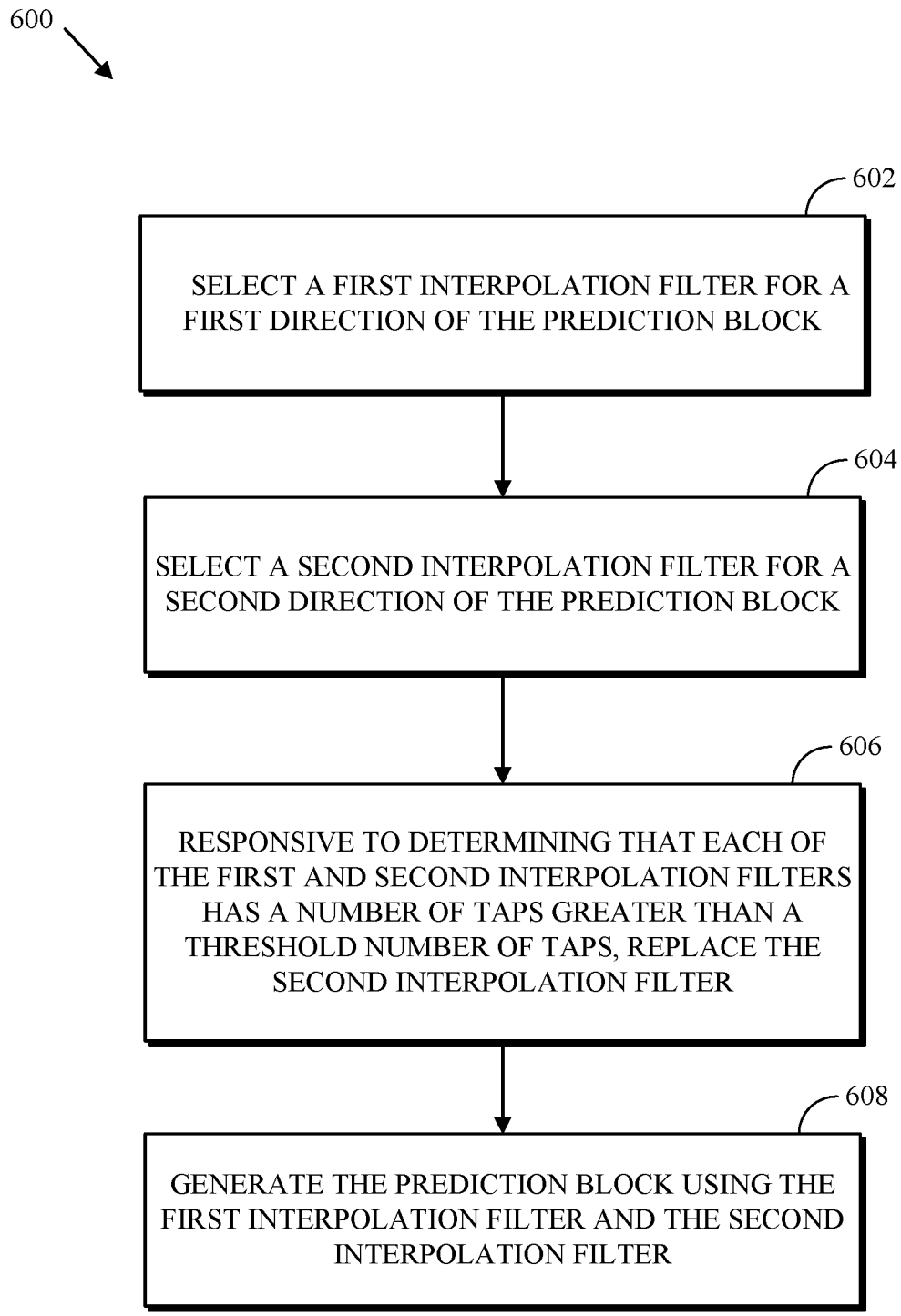
FIG. 6 is a flowchart diagram of a process for determining a prediction block according to an implementation of this disclosure.

FIG. 6 is a flowchart diagram of a process 600 for determining a prediction block according to an implementation of this disclosure. The process 600 can be implemented in an encoder such as the encoder 400 of FIG. 4. The process 600 can be implemented in a decoder, such as the decoder 500 of FIG. 5.

The process 600 can be implemented, for example, as a software program that can be executed by computing devices such as transmitting station 102. The software program can include machine-readable instructions that can be stored in a memory such as the memory 204 or the secondary storage 214, and that can be executed by a processor, such as CPU 202, to cause the computing device to perform the process 600. In at least some implementations, the process 600 can be performed in whole or in part by the intra/inter prediction stage 402 of the encoder 400 of FIG. 4. The process 600 can be performed in whole or in part during the reconstruction path (shown by the dotted connection lines) of the encoder 400 of FIG. 4.

In at least some implementations, the process 600 can be performed in whole or in part by the intra/inter-prediction stage 508 of the decoder 500 of FIG. 5. For example, the process 600 can be performed in whole or in part by the intra/inter-prediction stage 508 of the decoder 500. Implementations of the process 600 can be performed by storing instructions in a memory such as the memory 204 of the receiving station 106 to be executed by a processor such as CPU 202, for example.

The process 600 can be implemented using specialized hardware or firmware. Some computing devices can have multiple memories, multiple processors, or both. The steps or operations of the process 600 can be distributed using different processors, memories, or both. Use of the terms "processor" or "memory" in the singular encompasses computing devices that have one processor or one memory as well as devices that have multiple processors or multiple memories that can be used in the performance of some or all of the recited steps.

The process 600 generates a prediction block of prediction pixel values based on pixel values of the pixels (i.e., samples) of a reference block or a reference frame. The process 600 applies a first interpolation filter in a first direction and a second interpolation filter in a second direction. The first direction and the second direction can be the horizontal and vertical directions of the reference block, respectively. Alternatively, the first direction and the second direction can be the vertical and the horizontal directions of the reference block, respectively. In brief, the process 600 selects the first interpolation filter and the second interpolation filter such that at least one of the first interpolation filter or the second interpolation filter has a number of taps that is less than a threshold number of taps, e.g., only a single direction has a long interpolation filter.

The first interpolation filter and the second interpolation filter can be applied to pixel values at pixel positions of a reference block to generate pixel values of the prediction block as described below with respect to FIGS. 9A and 9B. The reference block can be a reference block of a previously constructed reference frame determined using motion vectors as described with respect to the intra/inter prediction stage 402 of FIG. 4 and the intra/inter-prediction stage 508 of FIG. 5. The prediction block is a prediction block formed based on sub-pixel motion. Sub-pixel interpolation is described below with respect to FIG. 7. Sub-pixel motion is described below with reference to FIG. 8.

At 602, the process 600 selects a first interpolation filter for a first direction of the prediction block. The first interpolation filter may be selected from multiple available interpolation filters. The first interpolation filter has a first number of taps (i.e., a first size). For example, the first number of taps can be 4 taps, 6 taps, 8 taps, 12 taps, or any other number of taps of the available interpolation filters. Each n-tap interpolation filter (where n is a positive multiple of two at least equal to four in this example) may have a different frequency response, such that there are more than one available interpolation filters having 8 taps, more than one available interpolation filters having 12 taps, etc.

At 604, the process 600 selects a second interpolation filter for a second direction of the prediction block. The second interpolation filter may be selected from the same set of available interpolation filters as the first interpolation filter, or the interpolation filters available as the second interpolation filter may be different from, in whole or in part, the interpolation filters available as the first interpolation filter. The second interpolation filter has a second number of taps (i.e., a second size). For example, the second number of taps can be 4 taps, 6 taps, 8 taps, 12 taps, or any other number of taps of the available interpolation filters.

The process 600, when implemented by an encoder, can select the first interpolation filter and the second interpolation by performing sub-pixel motion-compensated prediction using combinations of available interpolation filters having different number of taps. The combination resulting in the smallest residual error can be selected by the process 600. That is, 602 and 604 may be performed concurrently and iteratively. The first interpolation and the second interpolation filter can be of the same filter (e.g., smooth filter, sharp filter, or normal filter) or can be different filters. For example, the first interpolation filter can be the sharp filter and the second interpolation filter can also be the sharp filter. The first interpolation filter and the second interpolation filter can have the same size (e.g., 8 taps, 12 taps, etc.). The first interpolation filter and the second interpolation filter can have different sizes. That is, the first number of taps may be equal to or different from the second number of taps.

The smallest residual error can be based on a rate distortion determination. A rate-distortion ratio refers to a ratio that balances an amount of distortion (i.e., loss in video quality) with rate of bits (i.e., the number of bits) required for encoding the residual.

The process 600, when implemented by a decoder, can determine the first interpolation filter and the second interpolation filter by receiving, via an encoded bitstream (encoded by an encoder), indications of the first interpolation filter and the second interpolation filter. In some implementations, the process 600 can receive an indication of one of the first or second interpolation filters and determine, by a set of rules, the other interpolation filter. For example, the rules may define that, when one filter is a 12-tap interpolation filter, the other filter should be an 8-tap interpolation filter. In this example, the process 600 can receive an indication that the first or second interpolation filter is a 12-tap sharp filter and accordingly set the other interpolation filter to an 8-tap sharp filter.

At 606, the process 600 can replace or reset one of the filters, in this example the second interpolation filter, responsive to determining that the first number of taps and the second number of taps are each greater than a threshold number of taps. For example, the process 600 can replace the second interpolation filter by setting the second interpolation filter to an interpolation filter having a third number of taps. The third number of taps can be smaller than or equal to the threshold number of taps. The third number of taps can be less than the first number of taps and less than the second number of taps.

In an example, the threshold number of taps is 8 taps. If the first interpolation filter is determined to be a 12-tap sharp filter and the second interpolation filter is determined to be a 12-tap sharp filter, then the process 600 can set the second interpolation filter to an 8-tap sharp filter. The process 600 can alternatively set the second interpolation filter to any other sharp filter having 8 or less taps. If the first interpolation filter is determined to be a 12-tap sharp filter and the second interpolation filter is determined to be a 4-tap sharp filter, then the process 600 does not reset the second interpolation. This is so because, while the first number of taps (i.e., 12-taps) is greater than the threshold number of taps (i.e., 8-taps), the second number of taps (i.e., 4-taps) is not greater than the threshold number of taps (i.e., 8-taps).

The process 600 can reset the second interpolation filter to the same filter type as the type of the filter determined at 604, but this is not required. In an example, if the filter determined at 604 is a 10-tap smooth filter (i.e., the filter type is the "smooth filter"), then the process 600 can reset the second filter to an 8-tap smooth filter.

At 608, the process 600 generates the prediction block using the first interpolation filter and the second interpolation filter. One of the first interpolation and the second interpolation filter can be used to generate intermediate pixel values. Intermediate pixel values can be generated by applying the interpolation filter to the pixels of the reference block or reference frame. The other interpolation can be applied to the intermediate pixels to generate the pixel values of the prediction block. Other ways of using the first and second interpolation filter to generate the prediction block are possible.

The process 600 can apply the interpolation filter with the higher number of taps to generate the intermediate pixels and the interpolation filter with the lower number of taps to generate the pixels of the prediction block. For example, if the first interpolation filter is a 12-tap filter and the second interpolation filter is an 8-tap filter, then the process 600 can apply the long interpolation filter (i.e., the interpolation filter with the higher number of taps) to determine the intermediate pixel values and can apply the shorter interpolation filter (i.e., lower number of taps) to the intermediate pixel values to determine the pixel values of the pixels of the prediction block.

Alternatively, the process 600 can determine the intermediate pixel values for the prediction block using the one of the first interpolation filter and the second interpolation filter having the smaller number of taps. That is, the process 600 can use the shorter interpolation filter to determine the intermediate pixel values of the prediction block. Using the above example, the process 600 applies the 8-tap filter to the pixel values of the reference block or reference frame to determine the intermediate pixels values; the process 600 can then apply the 12-tap filter to the intermediate pixel values to generate the pixel values of the prediction block.

The tradeoffs of applying the shorter or the longer interpolation filter to determine the intermediate pixel values for the prediction block are discussed below with respect to FIGS. 9A and 9B.

In some implementations, the process 600 determines a sub-pixel interpolation filter from a single set of predefined or available sub-pixel interpolation filter types. The predefined sub-pixel interpolation filter types can include the interpolation filters described with respect to FIG. 8, namely a smooth interpolation filter, a sharp interpolation filter, and a normal interpolation filter. Other filter types can be available. Each of the interpolation filters can correspond to a baseband width. The smooth interpolation filter can have a narrow baseband and filters out most high frequency information to provide a smooth outcome in the pixel domain. The normal interpolation filter can have a median baseband. The sharp interpolation filter can have a wide baseband and preserve more high frequency components to provide sharp-looking outcomes in the pixel domain.

In an example implementing the process 600, one of the first number of taps or the second number of taps is greater than the threshold number of taps and the other of the first number of taps and the second number of taps is less than or equal to the threshold number of taps. For example, for a threshold number of taps of 8, the first number of taps (or the second number of taps) can be 10 taps and the second number of taps (or the first number of taps) can be 4 taps.

In another example, one of the first number of taps and the second number of taps is greater than the threshold number of taps and the other of the first number of taps and the second number of taps is greater than the threshold number of taps. For example, for a threshold number of taps of 8, the first number of taps (or the second number of taps) can be 10 taps and the second number of taps (or the first number of taps) can be 12 taps.

The process 600 may encode, in an encoded bitstream, an indication of the first interpolation filter, the second interpolation filter, or both of the first and the second interpolation filters. For example, the process 600 can add syntax elements to the encoded bitstream to indicate an interpolation filter. The indication can indicate the interpolation filter type (e.g., smooth, sharp, normal) and the size of the filter (e.g., 4-tap, 8-tap, 12-tap, etc.). In some cases, the indication may use one syntax element to indicate both the filter type and size, for example using an index to a table of multiple available interpolation filters.

FIG. 7 is a diagram of an interpolation operation according to an implementation of this disclosure. In the example of FIG. 7, a 6-tap filter is used. This means that values for the sub-pixels or pixel positions 720, 722, 724 can be interpolated by applying an interpolation filter to the pixel positions 700-710. Pixel position 720 is a half-pixel position between the two pixel positions 704 and 706, while pixel positions 722 and 724 are quarter-pixel positions between the two pixel positions 704 and 706. The pixel positions 722 and 724 may be referred to as a quarter-pixel and a three-quarter-pixel, respectively. Only sub-pixel positions between the two pixel positions 704 and 706 are shown in FIG. 7. However, sub-pixel values for other sub-pixel positions between the other full pixels of the line of pixels can be determined in a like manner. For example, a sub-pixel value between the two pixel positions 706 and 708 may be determined or generated by applying an interpolation filter to the pixels at pixel positions 702, 704, 706, 708, 710, and an integer pixel adjacent to the pixel position 710, if available.

In order to produce pixel values for the sub-pixel positions, an interpolation operation can be applied. In one example, the interpolation operation is performed using interpolation filters such as finite impulse response (FIR) filters. An interpolation filter may comprise a 4-tap filter, a 6-tap filter, an 8-tap filter, a 10-tap filter, a 12-tap filter, or other size filter. The taps of an interpolation filter weight spatially neighboring pixel values with coefficient values (i.e., weights of the interpolation filter) to generate a sub-pixel value. The neighboring pixel values can be values of integer pixels or values of intermediate pixels as further described below with respect to FIGS. 9A and 9B. In general, the interpolation filter used to generate each sub-pixel value at different sub-pixel positions between two pixels is different (i.e., has different coefficient values).

The pixels at pixel positions 700-710 can be integer pixels in a reference frame of a reference block. For example, and referring to FIG. 8, the pixels at pixel positions 700-710 can be pixels of a reference frame 830 (for example, pixels of reference blocks 829, 831, 833). The pixels at pixel positions 720-724 can be intermediate pixels (such as pixel 908 of FIGS. 9A and 9B). Alternatively, the pixels at pixel positions 700-710 can be intermediate pixels (i.e., sub-pixel values) as described with respect to FIGS. 9A and 9B and the pixel positions 720-724 can be pixels of the prediction block (e.g., prediction pixels 958, 980, and 982 of FIG. 9B).

FIG. 8 is a diagram 800 of motion vectors representing full and sub-pixel motion according to implementations of this disclosure. In FIG. 8, several blocks 802, 804, 806, 808 of a current frame 810 are inter-predicted using pixels from the reference frame 830. In this example, the reference frame 830 is a reference frame in a video sequence including the current frame 810, such as the video stream 300 of FIG. 3.

The reference frame 830 is a reconstructed frame (i.e., one that has been encoded and decoded such as by the reconstruction path of FIG. 4 or by the reconstruction stage 510 of FIG. 5) that has been stored in a so-called last reference frame buffer and is available for coding blocks of the current frame 810 in this example. Other (e.g., reconstructed) frames, or portions of such frames may also be available for inter-prediction. Other available reference frames may include a golden frame, which is another frame of the video sequence that may be selected (e.g., periodically) according to any number of techniques, and a constructed reference frame, which is a frame that is constructed from one or more other frames of the video sequence but is not shown as part of the decoded output, such as the output video stream 516 of FIG. 5.

The prediction block 832 for encoding the block 802 corresponds to a motion vector 812. A prediction block 834 for encoding the block 804 corresponds to a motion vector 814. A prediction block 836 for encoding the block 806 corresponds to a motion vector 816. Finally, a prediction block 838 for encoding the block 808 corresponds to a motion vector 818. Each of the blocks 802, 804, 806, 808 is inter-predicted using a single motion vector and hence a single reference frame in this example, but the teachings herein also apply to inter-prediction using more than one motion vector (such as bi-prediction using two different reference frames), where pixels from each prediction are combined in some manner to form a prediction block.

Figure 9B:
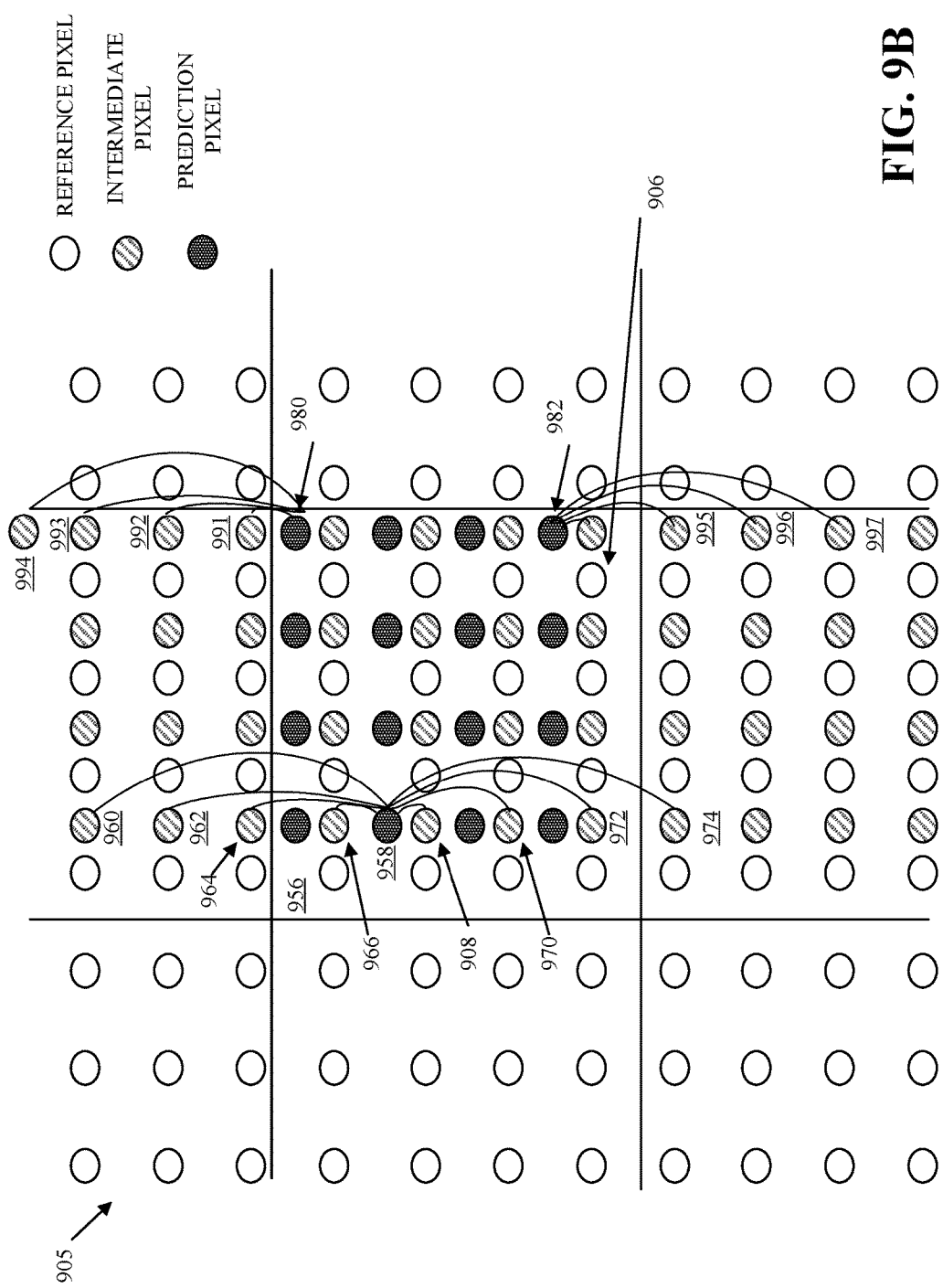

FIGS. 9A and 9B are diagrams of generating a prediction block according to implementations of this disclosure. FIGS. 9A and 9B illustrate generating a 4×4 prediction block 956 of FIG. 9B (represented by the filled circles, such as prediction pixels 958, 980, and 982) based on reference pixels including, for example, reference pixels of a reference block 906 of FIG. 9A (represented by the empty circles, such as pixels 916, 918, 920, 922). Herein, a reference to "a pixel xxx" means "a pixel value of the pixel at position xxx." The reference block 906 can be the reference block 831 of FIG. 8, the prediction block 956 can be the prediction block 832 of FIG. 8, pixels 910, 912, 914 can be pixels in the reference block 829, and pixel 924 can be a pixel in the reference block 833 of FIG. 8. FIGS. 9A and 9B illustrate generating a 4×4 prediction block using two-dimensional 8-tap interpolation filters applied in the horizontal and the vertical direction. However, the disclosure is not so limited. For example, the disclosure applies to any size prediction block. For example, the disclosure applies to any size interpolation filter.

FIG. 9A illustrates applying a first interpolation filter in a first direction (in this case, in the horizontal direction), to pixel values of the reference frame 905 (including the pixels of the reference block 906) to generate intermediate pixel values (at positions represented by the half-filled pixels, such as pixel 908). FIG. 9B illustrates applying a second interpolation filter in a second direction (in this case, in the vertical direction) to the intermediate pixel values to generate pixel values of the prediction block 956. However, the first direction can be vertical direction and the second direction can be the horizontal direction. That is, the teachings herein are not limited as to which direction an interpolation filter is applied first.

Referring now to FIG. 9A, the reference pixels can be integer pixel value within a reference frame 905 (shown as unfilled circles). The integer pixels are arranged along a first direction and a second direction (i.e., x- and y-axes or y- and x-axes). The first direction can be the horizontal or vertical direction. The second direction is the other direction (i.e., the vertical direction or the horizontal direction).

In order to generate the 4×4 prediction block 956 of FIG. 9B, 44 intermediate pixel values (as shown in FIG. 9A) are used. For example, to generate the prediction pixel 958 using an 8-tap filter, four intermediate pixels above the prediction pixel 958 (namely, pixels 960, 962, 964 and 966) and four intermediate pixels below the prediction pixel 958 (namely, pixels 908, 970, 972, and 974) are used. Generating an intermediate pixel, such as the pixel 908 of FIG. 9A, using an 8-tap, filter requires four integer pixels to the left of the pixel 908 (namely, pixels 910, 912, 914, and 916) and four integer pixels to the right of the pixel 908 (namely, pixels 918, 920, 922, and 924). As such, for each pixel of the 4×4 prediction block, eight intermediate pixel values are used. That is, a total of 44 (i.e., 4*4*8=44) intermediate pixel values are used.

To generate an intermediate pixel value, eight (8) multiplication operations are required. For example, assuming that the 8-tap horizontal filter (i.e., the filter used to generate the intermediate pixels of FIG. 9A) has the weights (w1, w2, w3, w4, w5, w6, w7, w8), then pixel 908 can be calculated using equation (1):

$$\text{pixel 908} = (\text{pixel 910})*w1 + (\text{pixel 912})*w2 + (\text{pixel 914})*w3 + (\text{pixel 916})*w4 + (\text{pixel 918})*w5 + (\text{pixel 920})*w6 + (\text{pixel 922})*w7 + (\text{pixel 924})*w8. \quad (1)$$

As stated above, generating a prediction pixel, in the example of FIGS. 9A and 9B, requires four (4) intermediate pixel values above and four (4) intermediate pixel values below the prediction pixel. Generating prediction pixel 980 of the prediction block 956 (i.e., a pixel in the top row of the prediction block) requires four intermediate pixels outside the reference block 906 (namely, pixels 991, 992, 993, and 994). The use of four corresponds to half the size of the interpolation filter size in the vertical direction (i.e., 8-tap). Generating the prediction pixel 982 of the prediction block 956 (i.e., a pixel in the bottom row of the prediction block) requires three intermediate pixels outside the reference block 906 (namely, pixels 995, 996, and 997). The use of three corresponds to one less (i.e., 4−1=3) than the size of the interpolation filter in the vertical direction. The total number of multiplication operations required to generate a prediction block using 2D interpolation filters can be determined using equation (2):

$$\begin{cases} \text{multiplications} = \text{stage 1} + \text{stage 2} \\ \text{stage 1} = (blockSize2 + filter2Size - 1) * filter1size * blockSize1 \\ \text{stage 2} = blockSize1 * blockSize2 * filter2size \end{cases} \quad (2)$$

In equation 2, multiplications is the total number of multiplication operations required to generate a prediction block, such as the prediction block 956, stage 1 is the number of multiplication operations required to generate the intermediate pixel values, and stage 2 is the number of multiplication operations required to generate the pixel values of the prediction block from the intermediate pixels. BlockSize and blockSize2 correspond to the sizes of the first dimension and the second dimension of the prediction block, respectively. Filter1size corresponds to the size (i.e., number of taps) of the interpolation filter used to generate the intermediate pixel values. Filter2size corresponds to the size (i.e., number of taps) of the interpolation filter used to generate the prediction pixel values from the intermediate pixel values. In the foregoing, the same number of pixel values are assumed to be on either side (i.e., left/right or top/bottom) of the value to be generated by the interpolation operation. However, that need not be the case and this disclosure is not so limited. For example, for an M-tap interpolation filter (i.e., an interpolation filter of size M), if the interpolation operation uses N pixel values to the left/top of the pixel value to be determined, then the interpolation operation also uses (M−N) pixel values to the left/below the pixel value to be determined.

For the example used in FIGS. 9A and 9B, the prediction block size is 4×4. As such, blockSize1=4 and blockSize2=4. As 8-tap filters are used in both the vertical and the horizontal direction, filter1size=8 and filter2size=8. Therefore, the total number of multiplication operations, multiplications=((4+8−1)*8*4)+(4*4*8)=480 multiplication operations. As another example, to generate a 4×4 prediction block using a 12-tap filter to generate the intermediate pixels and a 12-tap filter to generate the prediction pixels, the number of multiplication operations is multiplications=((4+12−1)*12*4)+(4*4*12)=912 multiplication operations.

The number of multiplication operations increases as the sizes (i.e., number of taps) of the interpolation filters increase. To reduce the number of multiplication operations, an interpolation filter design (i.e., a selection of first interpolation filter and a second interpolation filter) described herein limits the use of interpolation filters with a number of taps larger than a threshold number of taps (e.g., a long interpolation filter) to no more than one direction. For example, the threshold number of taps can be 8 taps. As such, a 12-tap filter is limited to no more than one direction. If, for example, a 12-tap sharp filter is selected (such as by the intra/inter prediction stage 402 of encoder 400) for both the vertical and the horizontal directions, then the 12-tap sharp filter can be used in one direction and a shorter (e.g., an 8-tap sharp filter) can be used in the other direction. The 8-tap filter and the 12-tap filter can be arbitrarily assigned to the first direction and the second direction. In an implementation, the long filter (e.g., a 12-tap filter) can always be assigned to the horizontal direction and the shorter filter (e.g., an 8-tap filter) can always be assigned to the vertical direction, or vice versa.

When generating a prediction block in an example of the teachings herein, a 12-tap filter can be used, if at all, either in the horizontal direction or the vertical direction, but not in both directions at the same time. For example, using the 12-tap filter (i.e., a longer or long filter) to generate the intermediate pixels followed by the use of an 8-tap filter (i.e., the shorter filter) results in 656 (((4+8−1)*12*4)+(4*4*8))=656) multiplication operations. Contrastingly, using the 8-tap filter (i.e., the shorter filter) to generate the intermediate pixels followed by the use of the 12-tap filter (i.e., the long filter) results in 672 (((4+12−1)*8*4)+(4*4*12))=672) multiplication operations.

As using the longer (also called a long) interpolation filter first (i.e., to generate the intermediate pixels) followed by the shorter interpolation filter results in fewer multiplication operations than using the shorter interpolation filter first (i.e., to generate the intermediate pixels) followed by the long interpolation filter, some implementations can process the direction with the long interpolation filter first to generate the intermediate pixels. Such implementations can be referred to as longer-filter-first interpolation.

In other implementations, referred to as shorter-filter-first interpolation, the shorter interpolation filter is processed first to generate the intermediate pixels even though more multiplication operations are required to generate the prediction block. Shorter-filter-first interpolation can reduce latency as described below.

Latency includes, in part, the time required to generate a pixel value by an interpolation filter. At least two types of operations may be performed by an interpolation filter to generate a value of a pixel, namely, and as illustrated by equation (1), multiplications and additions. Latency, as used herein, relates to the time required to perform the addition operations. At the completion of the addition operations, the pixel value being calculated (e.g., pixel 908 of equation (1)) becomes available. In hardware-implemented decoders (such as the decoder 500 of FIG. 5 or the reconstruction path of the encoder 400 of FIG. 4), latency can relate to the depth of adder trees. Adders (or adder trees) are digital circuits that can perform addition operations. Deeper adders (i.e., adders with more stages) can result in longer latency than shallower adders (i.e., adders with fewer stages). To reduce the latency, more hardware adder trees can be added to the decoder such that more interpolation operations can be performed in parallel. However, it may not be possible to add additional hardware adders to the decoder or it may be cost prohibitive to add adders. Therefore, while the techniques described herein can be used in any encoder or decoder implementation, reducing latency using the techniques disclosed herein is particularly useful in hardware decoders, or decoders where at least in the prediction stage is implemented in hardware.

For an interpolation filter of size m, an adder tree of depth d (i.e., number of stages) is used. The depth d can be determined using equation (3):

$$d = \text{roundup}(\log_2(m)) \quad (3)$$

In equation 3, roundup( ) rounds a value up to the nearest integer. For example, an 8-tap filter (i.e., size m=8) uses a three-stage adder (i.e., d=roundup($\log_2(8)$)=3); a 10-tap filter (i.e., m=10) uses a four-stage adder (i.e., d=roundup($\log_2(10)$)=roundup(3.32)=4); and a 12-tap filter (i.e., m=10) also uses a four-stage adder (i.e., d=roundup($\log_2(12)$)=roundup(3.58)=4).

As described above, sub-pixel motion prediction involves generating intermediate pixel values. The number of intermediate pixel values can be calculated using equation (4), which can be derived from the stage 1 calculation of equation (2):

$$\text{intermediate pixels} = (\text{blockSize2} + \text{filter2Size} - 1) * \text{blockSize1} \quad (4)$$

In equation (4), intermediate pixels is the number of intermediate pixels values, blockSize1, blockSize2, and filter2Size are as described in equation (1). BlockSize1 and blockSize2 correspond to the sizes of the first dimension and the second dimension of the prediction block, respectively. Filter2size corresponds to the size of the interpolation filter used to generate the prediction pixel values from the intermediate pixel values.

Longer-filter-first interpolation results in fewer intermediate pixel values than shorter-filter-first interpolation. That is, using the longer interpolation filter (e.g., the 12-tap filter) first (i.e., to generate the intermediate pixel values) followed by the shorter interpolation filter (e.g., 8-tap filter) results in fewer intermediate pixel values than using the shorter interpolation filter first. For example, using the 12-tap filter to generate the intermediate pixel values followed by the 8-tap filter to generate the prediction pixel values results in 44 ((4+8−1)*4=44) intermediate pixel values (and as described above, 656 multiplication operations); and using the 8-tap filter to generate the intermediate pixel values followed by the 12-tap filter to generate the prediction pixel values results in 60 ((4+12−1)*4=60) intermediate pixel values (and as described above, 672 multiplication operations).

In shorter-filter-first implementation, deeper (i.e., more stages of) adders are used than a longer-filter-first implementation. For example, a shorter-filter-first implementation that uses an 8-tap filter to generate the intermediate pixel values and a 12-tap filter to generate the prediction pixel values using the intermediate pixels, uses sixty (60) three-stage adders (i.e., one adder for each intermediate pixel value) and sixteen (16) four-stage adders (i.e., one adder for each of the 16 pixels of the 4×4 prediction block). On the other hand, a longer-filter-first implementation that uses a 12-tap filter to generate the intermediate pixel values and an 8-tap filter to generate the prediction pixel values using the intermediate pixel values, forty-four (44) four-stage adders (i.e., one adder for each intermediate pixel value) and 16 three-stage adders. As such, the shorter-filter-first implementation can require fewer four-stage adders and result in better (i.e., shorter) latency than a longer-filter-first implementation.

Figure 10:
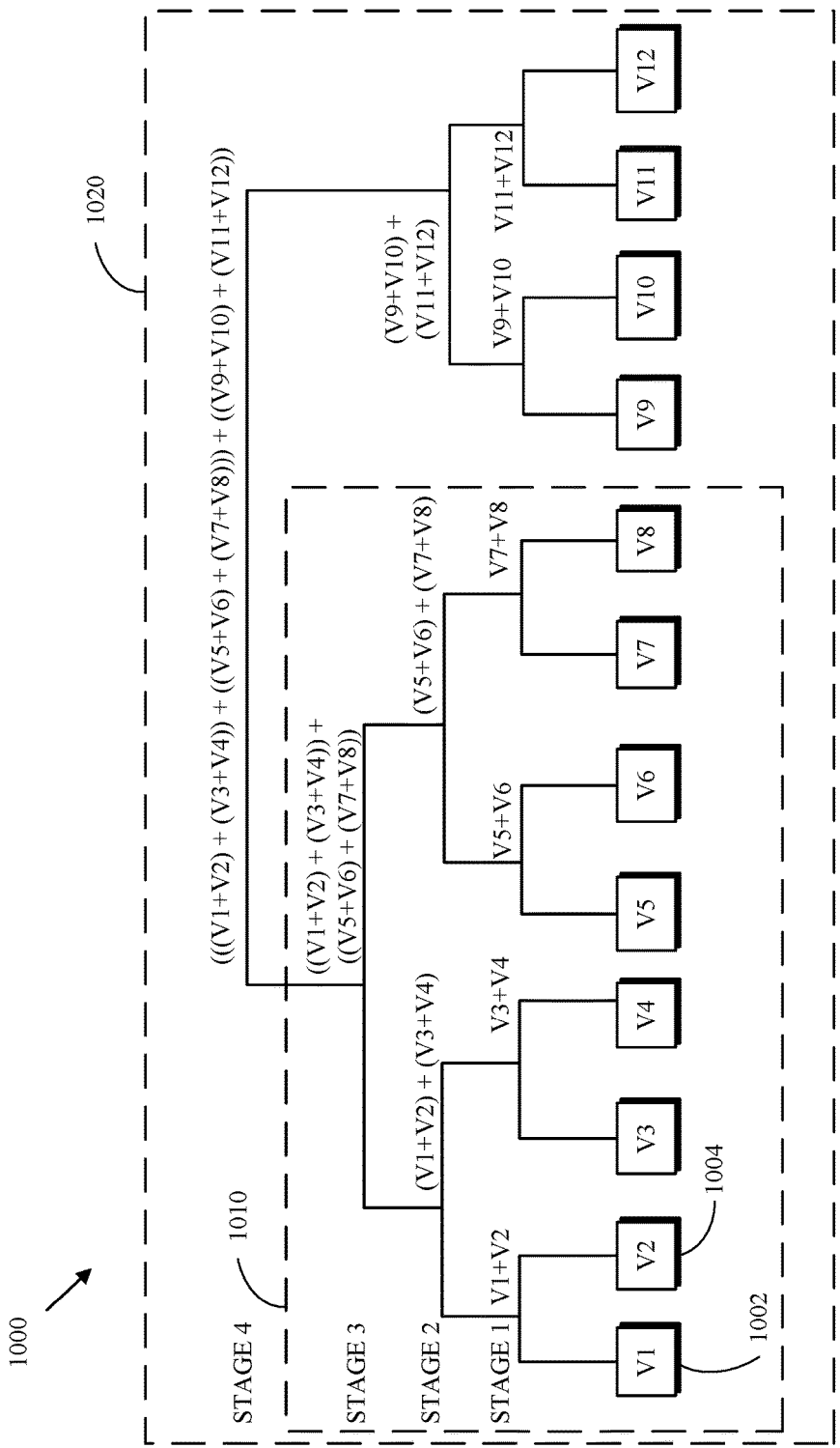
FIG. 10 is a diagram of adder trees according to implementations of this disclosure.

FIG. 10 is a diagram of adder trees 1000 according to implementations of this disclosure. The adder trees 1000 can be hardware adder trees that can be used with the generating of prediction blocks. For example, the adder trees 1000 can be used to perform the addition operations of interpolation. The adder trees 1000 includes a three-stage adder 1010 and a four-stage adder 1020. At each stage (i.e., tree level), pairs of values from the previous stage are added together. While specific sequences of operations (e.g., grouping of values) for the three-stage adder 1010 and the four-stage adder 1020 are presented below as an example, any sequence of operations can be performed by an adder tree.

Each of values V1-V12 of FIG. 10 can correspond to a result of a multiplication operation of an interpolation filter. For example, value 1002 can correspond to the result of the multiplication (pixel 910)*w1 and value 1004 can correspond to the result of the multiplication (pixel 912)*w2 of equation (1). That is, V1=(pixel 910)*w1 and V2=(pixel 912)*w2. V1-V8 can correspond to the multiplication results of an 8-tap filter; and V1-V12 can correspond to the multiplication results of a 12-tap filter. In the following, the value (a+b) (i.e., a parenthetical value such as (V1+V2)) is to be understood as being the result of the sum of the two values a and b.

The three-stage adder 1010 includes three addition stages: stage 1, stage 2, and stage 3. At stage 1, the sums V1+V2, V3+V4, V5+V6, and V7+V8 can be separately calculated. The results of the additions can be used at stage 2. At stage 2, the three-stage adder 1010 can calculate the sums (V1+V2)+(V3+V4) and (V5+V6)+(V7+V8). At stage 3, the value ((V1+V2)+(V3+V4))+((V5+V6)+(V7+V8)) can be calculated to provide the final result (i.e., an interpolated pixel value).

The four-stage adder 1020 includes four addition stages: stage 1 through stage 4. At stage 1, the sums V1+V2, V3+V4, V5+V6, V7+V8, V9+V10, and V11+V12 can be separately calculated. At stage 2, the four-stage adder 1020 can calculate the sums (V1+V2)+(V3+V4), (V5+V6)+(V7+V8), and (V9+V10)+(V11+V12). At stage 3, the value ((V1+V2)+(V3+V4))+((V5+V6)+(V7+V8)) can be calculated. At stage 4, the value (((V1+V2)+(V3+V4))+((V5+V6)+(V7+V8)))+((V9+V10)+(V11+V12)) is the final result (i.e., an interpolated pixel value).

Figure 11:
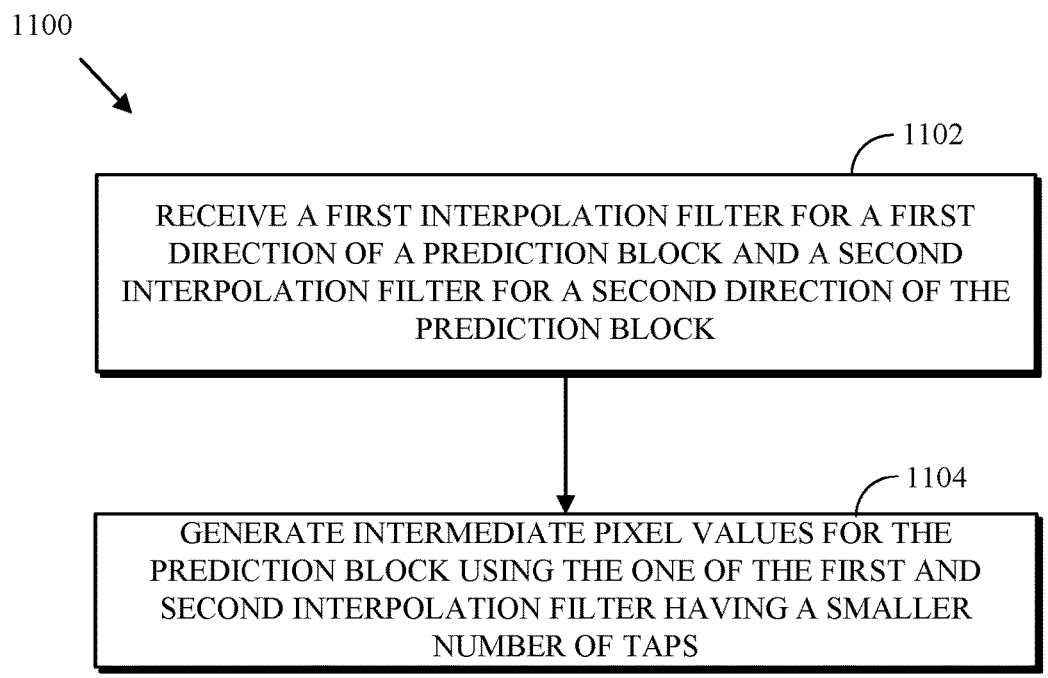
FIG. 11 is a flowchart diagram of a process for generating a prediction block by a decoder according to an implementation of this disclosure.

FIG. 11 is a flowchart diagram of a method or process 1100 for generating a prediction block by a decoder according to an implementation of this disclosure. The process 1100 may be performed by a decoder such as the decoder 500. For example, the process 1100 can be performed in whole or in part by the intra/inter-prediction stage 508 of the decoder 500. Implementations of the process 1100 can be performed by storing instructions in a memory such as the memory 204 of the receiving station 106 to be executed by a processor such as CPU 202, for example.

The process 1100 can be implemented using specialized hardware or firmware. Some computing devices can have multiple memories, multiple processors, or both. The steps or operations of the process 1100 can be distributed using different processors, memories, or both. For simplicity of explanation, the process 1100 is depicted and described as a series of steps or operations. However, the teachings in accordance with this disclosure can occur in various orders and/or concurrently. Additionally, steps in accordance with this disclosure may occur with other steps not presented and described herein. Furthermore, not all illustrated steps or operations may be used to implement a method in accordance with the disclosed subject matter.

At 1102, the process 1100 receives a first interpolation filter having a first number of taps for a first direction of the prediction block and a second interpolation filter having a second number of taps for a second direction of the prediction block.

The first interpolation filter and the second interpolation filter can be received as signals (e.g., syntax elements) in an encoded bitstream. In a non-limiting example, the syntax elements can indicate that the first interpolation filter having a first number of taps for a first direction and a second interpolation filter having a second number of taps for a second direction are a 12-tap sharp filter to be applied in the horizontal direction and an 8-tap sharp filter to be applied in the vertical direction, respectively.

The syntax elements may indicate the first interpolation filter, and the process 1100 can receive the second interpolation filter by setting the second interpolation filter. For example, the process 1100 can include a rule, a configuration, or the like, such that only one direction, if any, can use an interpolation filter that is greater than a threshold size (i.e., a threshold number of taps). For example, the syntax elements can indicate that the first interpolation filter is a 12-tap sharp filter. The process 1100 can then set the second interpolation filter to a filter having less than or equal a threshold number of taps. For example, the threshold number of taps can be 8. As the first interpolation filter size (i.e., 12) is greater than the threshold number of taps, the process 1100 can set the second interpolation filter to an 8-tap sharp filter in this example. The process 1100 can set the second interpolation filter to any interpolation filter having less than or equal 8-taps, such as, a 4-tap filter.

At 1104, the process 1100 generates intermediate pixel values for the prediction block using the one of the first interpolation filter and the second interpolation filter having a smaller number of taps. That is, the process 1100 can implement shorter-filter-first interpolation, as described above.

As mentioned above, some codecs may use 8-tap filters. The use of 12-tap filters, when generating sub-pixel motion compensated prediction, can improve compression as compared to these codecs. For example, using 12-tap filters in each of the horizontal and vertical directions can result in, approximately, 1.5% compression improvement as compared to using 8-tap filters. However, as indicated above, 12-tap filters can result in (e.g., hardware) latency. As such, implementations according this disclosure can define a bitstream syntax, encoder behavior, and/or decoder behavior that can individually or in combination reduce latency while using larger-than-8-tap interpolation filters (e.g., 12-tap filters), which can improve compression. For example, implementations according to this disclosure can limit 12-tap or longer interpolation filters to only one direction, implement shorter-filter-first interpolation, or a combination thereof.

The aspects of encoding and decoding described above illustrate some encoding and decoding techniques. However, it is to be understood that encoding and decoding, as those terms are used in the claims, could mean compression, decompression, transformation, or any other processing or change of data.

The words "example" or "implementation" are used herein to mean serving as an example, instance, or illustration. Any aspect or design described herein as "example" or "implementation" is not necessarily to be construed as preferred or advantageous over other aspects or designs. Rather, use of the words "example" or "implementation" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 102 and/or receiving station 106 (and the algorithms, methods, instructions, etc., stored thereon and/or executed thereby, including by encoder 400 and decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 102 and receiving station 106 do not necessarily have to be implemented in the same manner.

Further, in one aspect, for example, transmitting station 102 or receiving station 106 can be implemented using a computer or processor with a computer program that, when executed, carries out any of the respective methods, algorithms and/or instructions described herein. In addition, or alternatively, for example, a special purpose computer/processor can be utilized which can contain other hardware for carrying out any of the methods, algorithms, or instructions described herein.

Transmitting station 102 and receiving station 106 can, for example, be implemented on computers in a video conferencing system. Alternatively, transmitting station 102 can be implemented on a server and receiving station 106 can be implemented on a device separate from the server, such as a hand-held communications device. In this instance, transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 102. Other transmitting station 102 and receiving station 106 implementation schemes are available. For example, receiving station 106 can be a generally stationary personal computer rather than a portable communications device and/or a device including an encoder 400 may also include a decoder 500.

Further, all or a portion of implementations of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. A method for determining a prediction block, comprising:
    selecting a first interpolation filter for a first direction of the prediction block, the first interpolation filter having a first number of taps;
    selecting a second interpolation filter for a second direction of the prediction block, the second interpolation filter having a second number of taps;

in response to determining that the first number of taps is greater than a threshold number of taps and the second number of taps is greater than the threshold number of taps, setting the second interpolation filter to an interpolation filter having a third number of taps, wherein the third number of taps is smaller than or equal to the threshold number of taps; and generating the prediction block using the first interpolation filter and the second interpolation filter, wherein generating the prediction block comprises:

determining intermediate pixel values for the prediction block using the one of the first interpolation filter and the second interpolation filter having a smaller number of taps; and determining prediction pixel values for the prediction block using the intermediate pixel values and the other of the first interpolation filter and the second interpolation filter.

2. The method of claim 1, wherein the threshold number of taps is 8 taps.

3. The method of claim 1, wherein the third number of taps is less than or equal to 8 taps.

4. The method of claim 1, wherein the first number of taps is 4 taps or the second number of taps is 4 taps.

5. The method of claim 1, further comprising:

encoding, in an encoded bitstream, an indication of the first interpolation filter and the second interpolation filter.

6. The method of claim 5, wherein the indication indicates that the first interpolation filter is a first sharp filter and the second interpolation filter is second sharp filter.

7. An apparatus for determining a prediction block, the apparatus comprising:

a processor configured to execute operations to:

select a first interpolation filter for a first direction of the prediction block, the first interpolation filter having a first number of taps;

select a second interpolation filter for a second direction of the prediction block, the second interpolation filter having a second number of taps;

in response to determining that the second number of taps is greater than a threshold number of taps, set the second interpolation filter to an interpolation filter having a third number of taps, wherein the third number of taps is smaller than or equal to the threshold number of taps; and generate the prediction block using the first interpolation filter and the second interpolation filter, wherein to generate the prediction block comprises to:

determine intermediate pixel values for the prediction block using the one of the first interpolation filter and the second interpolation filter having a smaller number of taps; and determine prediction pixel values for the prediction block using the intermediate pixel values and the other of the first interpolation filter and the second interpolation filter.

8. The apparatus of claim 7, wherein the threshold number of taps is 8 taps.

9. The apparatus of claim 7, wherein the third number of taps is less than or equal to 8 taps.

10. The apparatus of claim 7, wherein the first number of taps is 4 taps or the second number of taps is 4 taps.

11. The apparatus of claim 7, wherein the operations further comprise an operation to:

encode, in an encoded bitstream, an indication of the first interpolation filter and the second interpolation filter.

12. The apparatus of claim 11, wherein the indication indicates that the first interpolation filter is a first sharp filter and the second interpolation filter is second sharp filter.

13. An apparatus for generating a prediction block by a decoder, the apparatus comprising:

a processor configured to execute operations to:

receive a first interpolation filter having a first number of taps for a first direction of the prediction block and a second interpolation filter having a second number of taps for a second direction of the prediction block;

in response to determining that the first number of taps does not equal the second number of taps, generate intermediate pixel values for the prediction block using the one of the first interpolation filter and the second interpolation filter having a smaller number of taps;

in response to determining that the first number of taps equals the second number of taps, generate the intermediate pixel values for the prediction block using either of the first interpolation filter or the second interpolation filter; and generate prediction pixels using the intermediate pixel values and the other of the first interpolation filter and the second interpolation filter that is not used to generate the intermediate pixel values.

14. The apparatus of claim 13, wherein the first number of taps is 12 and the second number of taps is 8.

* * * * *